US012584531B2

(12) United States Patent
    Likus

(10) Patent No.: US 12,584,531 B2
(45) Date of Patent: Mar. 24, 2026

(54) CLAMPING AND/OR BRAKING DEVICE FOR HUMID ENVIRONMENTS

(71) Applicant: HEMA Maschinen- und Apparateschutz GmbH, Seligenstadt (DE)

(72) Inventor: Edmund Likus, Seligenstadt (DE)

(73) Assignee: HEMA Maschinen- und Apparateschutz GmbH, Seligenstadt (DE)

( * ) Notice: Subject to any disclaimer, the term of this patent is extended or adjusted under 35 U.S.C. 154(b) by 0 days.

(21) Appl. No.: 18/993,322

(22) PCT Filed: Apr. 22, 2024

(86) PCT No.: PCT/EP2024/060861
    § 371 (c)(1),
    (2) Date: Jan. 10, 2025

(87) PCT Pub. No.: WO2024/251424
    PCT Pub. Date: Dec. 12, 2024

(65) Prior Publication Data
    US 2025/0243916 A1     Jul. 31, 2025

(30) Foreign Application Priority Data

Jun. 5, 2023    (EP) .................................... 23177172

(51) Int. Cl.
    *F16D 49/14*        (2006.01)
    *F16D 65/18*        (2006.01)
(52) U.S. Cl.
    CPC .................................. *F16D 65/186* (2013.01)
(58) Field of Classification Search
    CPC ..... B23Q 2703/04; B23Q 16/07; F16D 65/22;
                    F16D 49/14; F16D 49/16; Y10T
                                                    279/1224
    See application file for complete search history.

(56) References Cited

U.S. PATENT DOCUMENTS

| | | | |
|---|---|---|---|
| 3,753,478 A | 8/1973 | Shiber | |
| 5,111,913 A | 5/1992 | Granbom | |

(Continued)

FOREIGN PATENT DOCUMENTS

| | | | |
|---|---|---|---|
| AT | E342149 T1 | 11/2006 | |
| AT | E376132 T1 | 11/2007 | |

(Continued)

OTHER PUBLICATIONS

International Search Report and Written Opinion, mailed Jul. 22, 2024, for Application No. PCT/EP2024/060855.

(Continued)

*Primary Examiner* — Nicholas J Lane
(74) *Attorney, Agent, or Firm* — Wolf, Greenfield & Sacks, P.C.

(57)                ABSTRACT

The disclosure relates to an annular elastic element for a clamping and/or braking device, the element comprising: an annular spring plate, wherein the annular spring plate has a first annular side surface and a second annular side surface; a first sealing element, wherein the first sealing element is arranged on the first side surface of the spring plate; a second sealing element, wherein the second sealing element is arranged on the second side surface of the spring plate, and wherein the second sealing element forms an inner projection in a region of an inner edge of the annular spring plate and forms an outer projection in a region of an outer edge of the annular spring plate; wherein the first sealing element forms a first projection. The disclosure further relates to a component for a pneumatic clamping and/or braking device and a pneumatic clamping and/or braking device, each having such an annular elastic element.

15 Claims, 8 Drawing Sheets

(56) References Cited

U.S. PATENT DOCUMENTS

| | | | | |
|---|---|---|---|---|
| 5,836,233 | A | 11/1998 | Rumsey | |
| 7,861,830 | B2 * | 1/2011 | Hofmann | F16C 29/10 |
| | | | | 92/92 |
| 2006/0042892 | A1 * | 3/2006 | Hofmann | B23Q 1/28 |
| | | | | 188/151 R |
| 2007/0090610 | A1 * | 4/2007 | Hoffmann | F16D 49/00 |
| | | | | 279/4.03 |
| 2008/0217872 | A1 * | 9/2008 | Hofmann | B23B 31/107 |
| | | | | 279/152 |
| 2025/0052292 | A1 * | 2/2025 | Zimmer | F16B 21/086 |
| 2025/0108465 | A1 * | 4/2025 | Likus | F16D 65/186 |
| 2025/0108486 | A1 * | 4/2025 | Likus | F16D 55/12 |
| 2025/0262723 | A1 | 8/2025 | Likus | |

FOREIGN PATENT DOCUMENTS

| | | | |
|---|---|---|---|
| AU | 2003287866 | A1 | 8/2004 |
| CN | 1842663 | A | 10/2006 |
| CN | 101228005 | A | 7/2008 |
| CN | 102678786 | A | 9/2012 |
| CN | 203412996 | U | 1/2014 |
| CN | 107127360 | A | 9/2017 |
| CN | 111322341 | B | 5/2021 |
| CN | 115325086 | B | 5/2025 |
| DE | 102 03 008 | A1 | 8/2003 |
| DE | 10335795 | A1 | 3/2005 |
| DE | 102005033468 | A1 | 1/2007 |
| DE | 102021006219 | B3 | 12/2022 |
| EP | 1629939 | A1 | 3/2006 |
| EP | 1585616 | B1 | 10/2006 |
| EP | 1651881 | B1 | 10/2007 |
| EP | 1910029 | A1 | 4/2008 |
| EP | 2 233 768 | A2 | 9/2010 |
| ES | 2274289 | T3 | 5/2007 |
| ES | 2295903 | T3 | 4/2008 |
| FR | 2 958 986 | A1 | 10/2011 |
| JP | 2006-513049 | A | 4/2006 |
| JP | 2007-501361 | A | 1/2007 |
| JP | 2009-501644 | A | 1/2009 |
| JP | 4602256 | B2 | 12/2010 |
| JP | 4607110 | B2 | 1/2011 |
| JP | 4987867 | B2 | 7/2012 |
| KR | 20060024334 | A | 3/2006 |
| PL | 1651881 | T3 | 3/2008 |
| WO | WO 01/34990 | A1 | 5/2001 |
| WO | WO 2004/067222 | A1 | 8/2004 |
| WO | WO 2005/015047 | A1 | 2/2005 |
| WO | WO 2006/021120 | A1 | 3/2006 |
| WO | WO 2007/009439 | A1 | 1/2007 |
| WO | WO 2023/109993 | A1 | 6/2023 |

OTHER PUBLICATIONS

International Search Report and Written Opinion mailed Jul. 22, 2024 in connection with International Application No. PCT/EP2024/060861.

\* cited by examiner

CLAMPING AND/OR BRAKING DEVICE FOR HUMID ENVIRONMENTS

CROSS-REFERENCE TO RELATED APPLICATIONS

This application is a national stage filing under 35 U.S.C. § 371 of International Application No. PCT/EP2024/060861, filed Apr. 22, 2024, which claims the benefit of European Application No. 23177172.6, filed Jun. 5, 2023. The contents of these applications are incorporated herein by reference in their entirety.

TECHNICAL FIELD

The disclosure relates to an annular elastic element as well as a component for a pneumatic clamping and/or braking device and a pneumatic clamping and/or braking device, each with such an annular elastic element. The disclosure further relates to a housing part for clamping the annular elastic element.

BACKGROUND

In the production of tool or machine parts, processing machines, in particular work spindles or other machine tools, are used which process material from a workpiece by means of tools fastened to a shaft, in particular in order to bring it into the desired shape. The shaft can be an axis of rotation or pivot axis of such a machine. Furthermore, rotatable or pivotable tables are used by means of a shaft to place tools or workpieces in the suitable processing position or to move workpieces at corresponding speeds. A prerequisite for precise and efficient processing is, inter alia, a high speed of the shaft. Emergency or safety systems therefore have the task of stopping the shaft in the event of malfunction or failure of the systems, such as power failure or cable breakage, or of holding it in a fixed position and thus fixing it.

Common processing machines have electromagnetic, hydraulic or pneumatic clamping and/or braking devices. Such devices have a friction lining which can be frictionally connected to the shaft by means of force transmission. Fixing the shaft at different speeds is thereby made possible.

In hydraulic clamping devices, a chamber is charged with hydraulic oil and clamps the rotating shaft or disc. Passive hydraulic clamps are also known. However, such hydraulic clamps have long reaction times or short reaction times require a very high outlay there. Furthermore, the hydraulic material, in particular hydraulic valves and hydraulic tubes, is expensive and requires longer assembly times. An additional outlay for maintaining the cleanliness in the environment of a hydraulic clamp is also to be recorded by the hydraulic oil.

In pneumatic clamping and/or braking devices, elastic elements, in particular resilient plates, are usually charged with compressed air and can overcome some of the mentioned disadvantages of hydraulic clamping devices.

EP 1 585 616 B1 and EP 1 651 881 B1 describe pneumatic clamping devices with two annular spring plates, which are introduced into a housing of the clamping devices and there form a pressure space, which can be charged with compressed air or aerated and deaerated in order to change the bending of the spring plates and thereby change between a closed state of the clamping devices, in which an object to be clamped is clamped like a rotatable shaft, and an open state of the clamping devices, in which the object is free.

However, it has been shown in practice that such clamps fail in humid environments or cannot be operated without interference.

EP 1 629 939 A1 discloses a pneumatic braking device, wherein this is unsuitable for humid environments, as explained below.

BRIEF DESCRIPTION

Proceeding from the prior art mentioned in the introduction, the disclosure is based on the object of providing means which enable a pneumatic clamping and/or braking device to be reliably operated in humid environments.

According to the solution according to the invention, an annular elastic element for a clamping and/or braking device is provided, the element comprising: an annular spring plate, the annular spring plate having a first annular side surface and a second annular side surface; a first sealing element, the first sealing element being arranged on the first side surface of the spring plate; a second sealing element, the second sealing element being arranged on the second side surface of the spring plate, and the second sealing element forming an inner projection in a region of an inner edge of the annular spring plate and forming an outer projection in a region of an outer edge of the annular spring plate, the first sealing element forming a first projection.

The term "annular" in this disclosure is not necessarily to be understood as circularly annular. Other annular embodiments, such as angular annular embodiments, also fall under this term.

According to the term "projection", the first projection rises or sticks out from a surface of the first sealing element. Likewise accordingly, the inner and outer projections rise or stick out from one or more surfaces of the second sealing element.

Preferably, the first sealing element is formed integrally and/or in one piece with the first projection. Preferably, the second sealing element is formed integrally and/or in one piece with the inner and/or outer projection.

According to the solution according to the invention, a component for a clamping and/or braking device is further provided, the component comprising: the annular elastic element according to the invention; and a housing part, the housing part having an annular recess for clamping the annular elastic element, and the housing part having an inner surface defined by the recess; wherein, when the elastic element is clamped with the first side surface facing the inner surface in the recess, the first projection of the first sealing element is adapted to make contact with a first portion of the inner surface of the housing part.

According to the solution according to the invention, a clamping and/or braking device for clamping and/or braking an object to be clamped and/or braked is further provided, the device comprising: a first elastic element according to the invention and a second elastic element according to the invention; a housing comprising a first housing part having an inner surface and a second housing part having an inner surface, the housing parts being arranged relative to one another and fastened to one another in such a way that the inner surfaces of the housing parts together delimit an inner space within the housing; one or more clamping elements, each clamping element having a clamping surface; a spring arranged in the inner space comprising the first elastic element and the second elastic element, the elastic elements being arranged within the inner space in such a way that a first pressure space is formed in the inner space between the elastic elements and the inner surfaces of the housing parts, the first pressure space being able to be deaerated and being able to be charged with positive pressure of a pressure medium which can be supplied to the housing, the first elastic element being clamped in the inner space with its first side surface facing the inner surface of the first housing part, and the second elastic element being clamped in the inner space with its first side surface facing the inner surface of the second housing part; wherein the spring is adapted such that, when the first pressure space is aerated or charged with positive pressure, a bending of at least one of the spring plates of the elastic elements is able to be changed and as a result the device changes between an open state, in which an object to be clamped is spaced apart from the one or more clamping surfaces, and a closed state, in which at least one of the one or more clamping surfaces transmits a clamping and/or braking force to the object; and wherein the first projection of the first sealing element of at least one of the elastic elements is adapted to make contact with a first portion of the inner surface of one of the housing parts, in order as a result to at least inhibit a flow connection between a region of the first pressure space and a transition between the housing parts.

The problem of trouble-prone operation of the clamping and/or braking devices in humid environments which has not been overcome for a long time has been able to be overcome by aspects of this invention. The following findings of the inventors are based on the disclosure.

During operation of the device under the influence of liquid media, in particular in the region of the clamping surface, there is the possibility of penetration of the liquid medium into the housing of the device. As a consequence of this possibility, penetration of the medium into the first pressure chamber is shown during operation, which leads to a build-up in the first pressure chamber. The penetration of the liquid medium leads to failure of the components on account of leaks (for example rubber damage), soiling in the device and worsening of the reaction times of the device. The inventors have recognised that the penetration of the liquid medium is to be attributed decisively to small gaps which are present at the transition of the housing parts, in particular of the two clamping elements or clamping surfaces of the housing parts, of the device. During the process of opening, for example, a second pressure chamber is expanded by, for example, the second pressure chamber being charged with compressed air. At the same time, the first pressure chamber is deaerated. The movement of the elastic element (for example rubberised spring plate) displaces the air out of the first pressure chamber and thus leads to a suction effect through the first pressure chamber. As a consequence of the penetration of the liquid medium into the first pressure chamber, a permanent small leak then generally arises, inter alia with respect to the second pressure chamber, which leads to a constant flow of the liquid medium as long as the second pressure chamber is expanded. As a result of this effect, the suction effect is further intensified and leads to accelerated failure or to premature malfunction in the device.

Against this background, the inventors have recognised that attaching a sealing element with a projection on the side of the elastic element facing the first pressure chamber interrupts this suction effect or inhibits it to such an extent that these above-described failures or malfunctions for the device can no longer occur. In particular, the fluidic connection of the first pressure chamber to the transition of the housing parts or clamping elements can be inhibited by these means without the opening and closing function of the device or the dynamics thereof being impaired as a result. In the elastic element according to the invention, a second sealing element is arranged on the second side surface of the annular spring plate and the second sealing element has an inner projection in a region of an inner edge of the annular spring plate of the elastic element and an outer projection in the region of an outer edge of the annular spring plate. These two projections at the inner and outer edge of the spring plate usually serve for resting on an opposite second elastic element or an inner wall of a housing in order to form the second pressure chamber there. Each of these two projections can therefore preferably have a bearing surface. According to the above findings of the inventors, the elastic element according to the invention has, on the other (first) side surface of the spring plate, which can accordingly face the first pressure chamber, a first sealing element which forms a first projection which is consequently suitable for projecting into the first pressure chamber and at least inhibiting the fluidic connection of the first pressure chamber to the transition of the housing parts there.

In the prior art mentioned in the introduction EP 1 629 939 A1, the lips 60, 61, 63, 64 there are separate from the polymer plates 57, 58 there. The lips 60, 61, 63, 64 there do not rise or stick out from the surfaces of the plates 57, 58 there, so that the polymer plates 57, 58 there do not form any projections for the lips 60, 61, 63, 64, which has a disadvantageous effect on the required tightness with respect to the environment. The lips there serve only for actuating the spring and the brake element.

The first projection is preferably formed between the inner and outer edge of the annular spring plate, particularly preferably the first projection being formed in a region of the inner or outer edge of the annular spring plate in order, depending on whether the clamping action is directed inwards or outwards, to be close to the above-described gaps between the clamping elements. The first projection is preferably attached to the first side surface of the annular spring plate in such a way that it is suitable for being attached in the region of the transition of the housing parts or of the clamping elements and for projecting into the first pressure chamber.

According to a preferred aspect of the elastic element, the first sealing element further has—preferably on the first side surface preferably in a region of the edge of the annular spring plate which is opposite the edge on which the first projection is arranged—a second projection which serves as a further interruption or inhibition of the fluidic connection of the first pressure chamber to the transitions of the housing parts or clamping elements.

According to a preferred aspect of the elastic element, the first and/or the second sealing element are vulcanised on the spring plate and are thus particularly well fixed there.

Preferably, the first and/or the second projection respectively have an at least sectionally rounded surface in order to produce, in an inner wall of the housing of any desired shape, a contact which can bring about the above-described inhibition or interruption of the fluidic connection.

According to a preferred aspect of the component or device, the housing part has an indentation or depression in the inner surface of the housing part, wherein the indentation or depression is preferably complementary in shape to the surface of the first or second projection contacting it, so that the above-described contact is particularly effective (sealing).

The inventors have recognised that both the first projection and the second, optional projection of the first sealing element are respectively also suitable for inhibiting or even avoiding an escape of pressure medium (in particular gases)

which can be applied to the first pressure chamber. In addition to use in humid environments, use of the clamp in a vacuum or clean room is thereby also made possible.

In order to reduce or prevent the escape of the pressure medium (in particular gases) into the environment even more effectively, the inventors have developed a series of further optional means for use of the clamp in a vacuum or clean room, which means can respectively be combined individually and in combination also with the above-described means for use in humid environments, in order also to bring about an even more reliable use of the clamp in a vacuum or clean room and thus to realize a universally usable clamp.

For example, the inner projection and/or outer projection of the second sealing element preferably respectively have an at least sectionally planar surface which can serve as a particularly sealing bearing surface, for example with respect to a housing wall or another elastic element. The clamp or the second pressure chamber thereof is thereby increasingly sealed in order to inhibit or prevent an escape of the pressure medium from the second pressure chamber into the environment. The planar surfaces increase the resistance to the permeability of a pressure medium (in particular gases) when the pressure medium is applied to the second pressure chamber. The planar surfaces reduce or prevent the overflow of a medium between the first pressure chamber and the second pressure chamber.

As an alternative or in addition to the planar surfaces, the inner and/or outer projection of the second sealing element can respectively form at least sectionally a preferably radially extending bulge (or bulge or outwardly directed curvature) in order to achieve a particularly good seal for use in a vacuum environment or in a clean room. The bulge can be produced by the application of additional (elastic) material of the sealing element with respect to the rest of the projection. These bulges can fill an inner space within a housing part, for example in the region of a transition of the housing parts, and can be brought into sealing contact against an inner wall (e.g. a bevel or long chamfer) of the housing part. The bulge is preferably respectively neighboring or adjacent to the planar surface. The planar surface preferably respectively merges into the bulge. The bulge of the outer projection of the second sealing element preferably extends radially outwards, preferably radially outwards beyond the outer edge of the spring plate. The bulge of the inner projection of the second sealing element preferably extends radially inwards, preferably radially inwards beyond the inner edge of the spring plate.

The bulges are particularly advantageous for sealing the first pressure chamber against a gap at the transition of adjacent housing parts. The bulges have the effect that, during operation of the first pressure chamber, hardly any medium or no medium flows in or out via the housing edge.

The planar surfaces additionally support the displacement of the bulges against the inner wall of the housing parts and thus the above-described effects of the bulges. This support is particularly pronounced when, as described, the planar surface and the associated bulge are neighboring or adjacent and/or merge into them. The planar surfaces and the respectively associated bulges thus form a combination of features which interact synergistically, but can be present individually.

With regard to use in a vacuum or clean room, the elastic material used for the elastic element can be a suitable material which preferably has hardly any or no release of material into the vacuum (high media resistance), is suitable for high temperatures and/or has a low gas permeability.

For use in humid environments or in a vacuum or clean room, a suitable material, preferably made of steel, can be used for the housing parts, which is preferably not susceptible to corrosion, in order to avoid the release of rust into the vacuum or the clean room.

In order to make a further contribution to a particularly good seal for use in a vacuum environment or in a clean room, the elastic element according to the invention can have a first port seal for a first port for applying a pressure medium to the first pressure chamber, the first port seal sealing the first port. Preferably, an edge of the first port seal can at least partially and preferably completely surround a first port opening and can be present in the form of an O-ring.

In order to make a further contribution to a particularly good seal for use in a vacuum environment or in a clean room, the elastic element according to the invention can have a second port seal for a second port for applying a pressure medium to the second pressure chamber, the second port seal sealing the second port. Preferably, an edge of the second port seal can at least partially and preferably completely surround a second port opening and can be present in the form of an O-ring. Particularly preferably, the edge can form a port projection of the second port seal which at least sectionally forms an undercut at the edge of the second port opening. The housing part can be undercut by the undercut of the port projection of the elastic element. The undercut of the second port seal intensifies the sealing towards the outside and reduces the risk of lifting the second port seal from the planar housing surface, especially when applying pressure to the first pressure chamber. In addition, the use of sealing compound (adhesive) at this point can be avoided by the undercut. Such a sealing compound could have a negative effect on the vacuum or clean room.

In order to make a further contribution to a particularly good seal for use in a vacuum environment or in a clean room, the housing part of a component or device according to the invention can have a, preferably circular, groove or nut for receiving an O-ring. The groove or nut with O-ring supports the above-described function of the bulge and the first port seal to the effect that, during operation of the first pressure chamber, no fluids flow in or out via the housing edge. In addition, the sealing compound (adhesive) between the housing halves, which is undesirable for use in a vacuum and in a clean room, can be dispensed with.

By means of the means described here individually and in combination, clamps can be provided which can be reliably operated in humid environments and, in addition, can optionally also additionally be operated in a vacuum or in a clean room without the dynamics of the opening and closing of the clamp being adversely impaired as a result.

If this brief description of the disclosure describes features which are not listed in the claims, these features do not constitute essential features in the sense that these features are necessarily to be included in the claims for the description of the disclosure, but these features are particularly prominent preferred implementations of the claimed invention, can be combined with each of the claims and can also be combined with one another as desired.

Figure 1A:
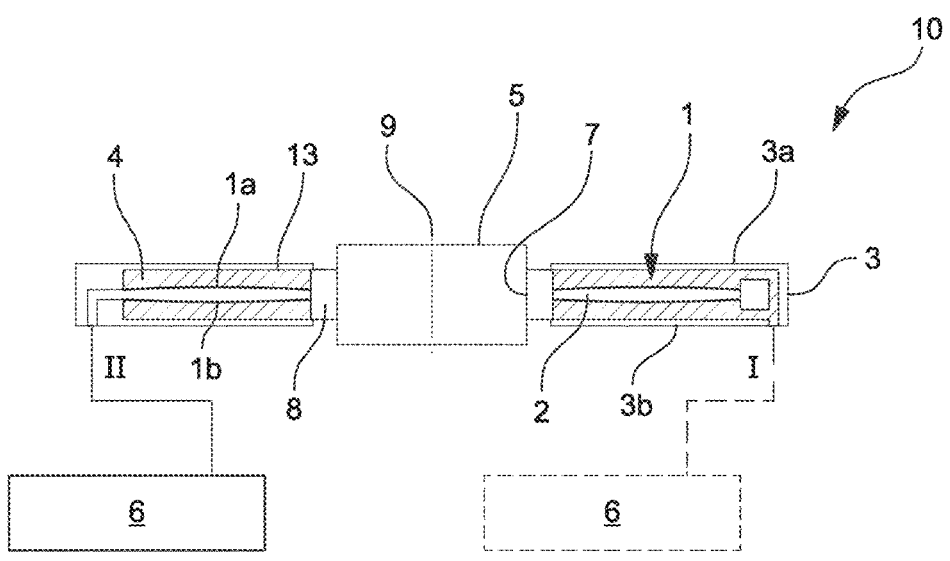
FIG. 1A shows a schematic cross section through an inwardly directed, passive pneumatic clamping and/or braking device according to the invention in the closed state.

Components which are illustrated in a plurality of figures bear the same reference signs.

DETAILED DESCRIPTION

The disclosure relates to an annular elastic element as well as a component for a pneumatic clamping and/or braking device and a pneumatic clamping and/or braking device, each with such an annular elastic element.

If in this document reference is made to the device "clamp" or "clamping device", to the "clamping force" or to the process of "clamping", then the device also comprises the "brake" or "braking device" or the "braking force" or the process of "braking".

FIGS. 1A to 5A and 8 show schematic cross sections through such a clamping device 10 according to the invention with a housing 3, which comprises two housing parts 3a, 3b, as well as with a spring 1 arranged in the housing 3, which comprises at least two annular elastic elements 1a, 1b according to the invention.

The clamping device 10 according to the invention comprises the following: a first elastic element 1a according to the invention and a second elastic element 1b according to the invention; a housing 3 comprising a first housing part 3a with an inner surface and a second housing part 3b with an inner surface, wherein the housing parts 3a, 3b are arranged with respect to one another and fastened to one another such that the inner surfaces of the housing parts 3a, 3b together delimit an inner space 13 within the housing 3; one or more clamping elements 8, wherein each clamping element 8 has a clamping surface 7; a spring 1 arranged in the inner space 13 comprising the first elastic element 1a and the second elastic element 1a, wherein the elastic elements 1a, 1b are arranged within the inner space 13 such that a first pressure space 4 is formed in the inner space 13 between the elastic elements 1a, 1b and the inner surfaces of the housing parts 3a, 3b, wherein the first pressure space 4 can be deaerated and can be acted upon by positive pressure of a pressure medium which can be fed to the housing 3, wherein the first elastic element 1a is clamped in the inner space 13 with its first side surface facing the inner surface of the first housing part 3a, and wherein the second elastic element 1b is clamped in the inner space 13 with its first side surface facing the inner surface of the second housing part 3b; wherein the spring 1 is designed such that when the first pressure space 4 is deaerated or acted upon by positive pressure, a bending of at least one of the spring plates of the elastic elements 1a, 1b can be changed and thereby the device 10 changes between an open state, in which an object 5 to be clamped is spaced apart from the one or more clamping surfaces 7, and a closed state, in which at least one of the one or more clamping surfaces 7 transmits a clamping and/or braking force to the object 5. The device 10 according to the invention furthermore comprises the means mentioned in the introduction which allow reliable operation of the device in a humid environment. These means are explained in more detail in connection with FIGS. 6 to 12.

FIGS. 1A, 1B, 4A and 4B each show such clamping devices 10 in the closed state in that the clamping surface 7 of the clamping element 8 touches the circumference of the object 5. The clamping element 8 is also referred to as a clamping lip. The clamping element 8 can be formed integrally with the other parts of the housing part 3a, 3b or can be a component of the housing part 3a, 3b which is structurally separate from the other parts.

Figures 5A, 5B, 5C, 5D:
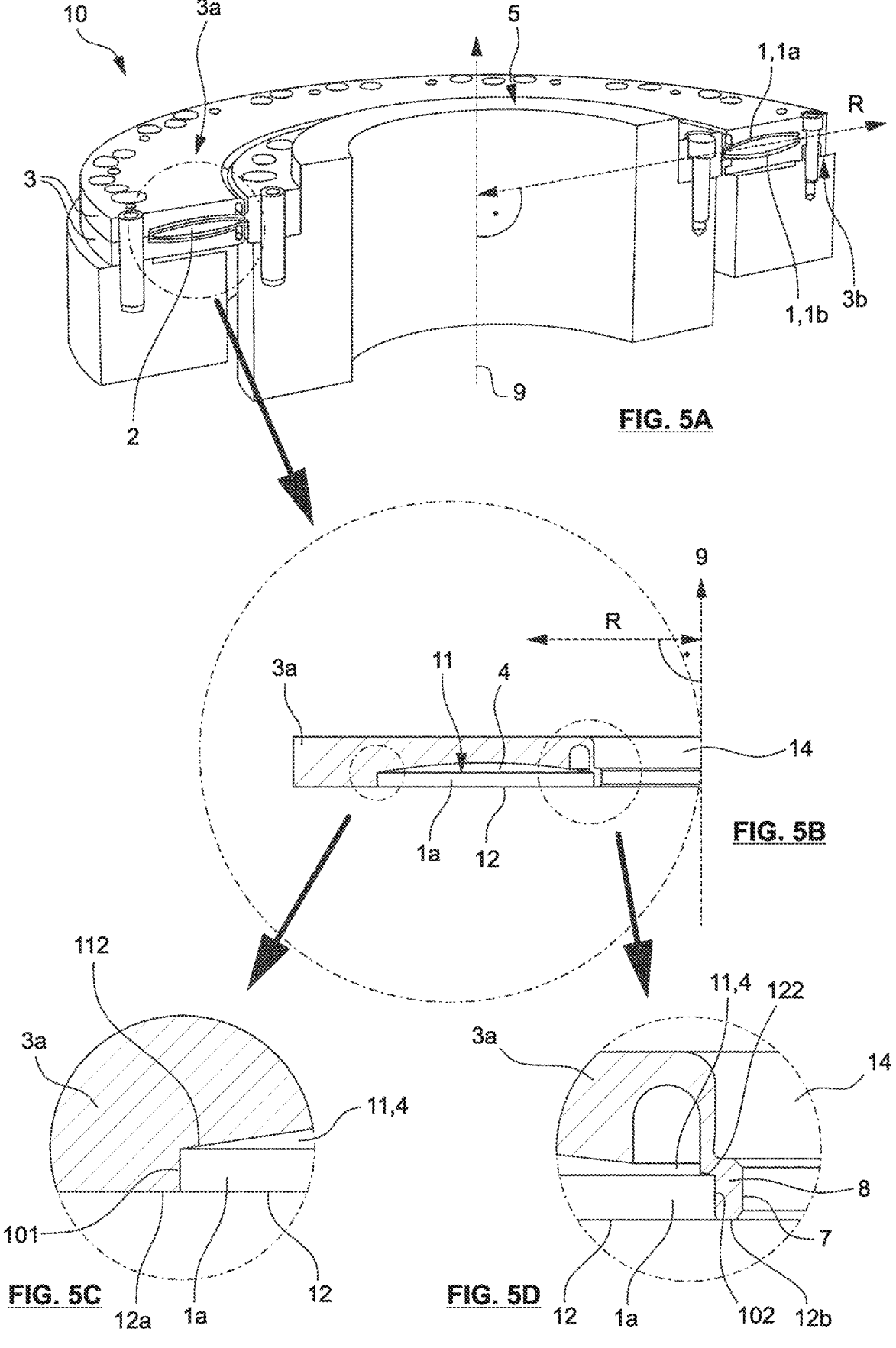
FIG. 5A shows a cross section through an inventive pneumatic clamping and/or braking device in a three-dimensional representation.
FIGS. 5B to 5D show a variant of a housing part taken from FIG. 5A.

The clamping force or clamping action of the clamping surface 7 on the object 5 to be clamped takes place in a clamping plane which is spanned by two vectors which each form a radius of the annular elastic elements 1a, 1b or annular recess 11 (cf. FIG. 5A). The axis 9 can run through the centre point of the ring of the components described here as annular and can therefore be referred to as the main axis of the clamping device 10 which can run perpendicular to the clamping plane. If in this document reference is made to "inner" and "outer" projection, edge or end, then inner edge(s), projection or end are closer to the axis 9 than corresponding outer edge(s), projection or end. The same can also apply to other components.

Figure 1B:
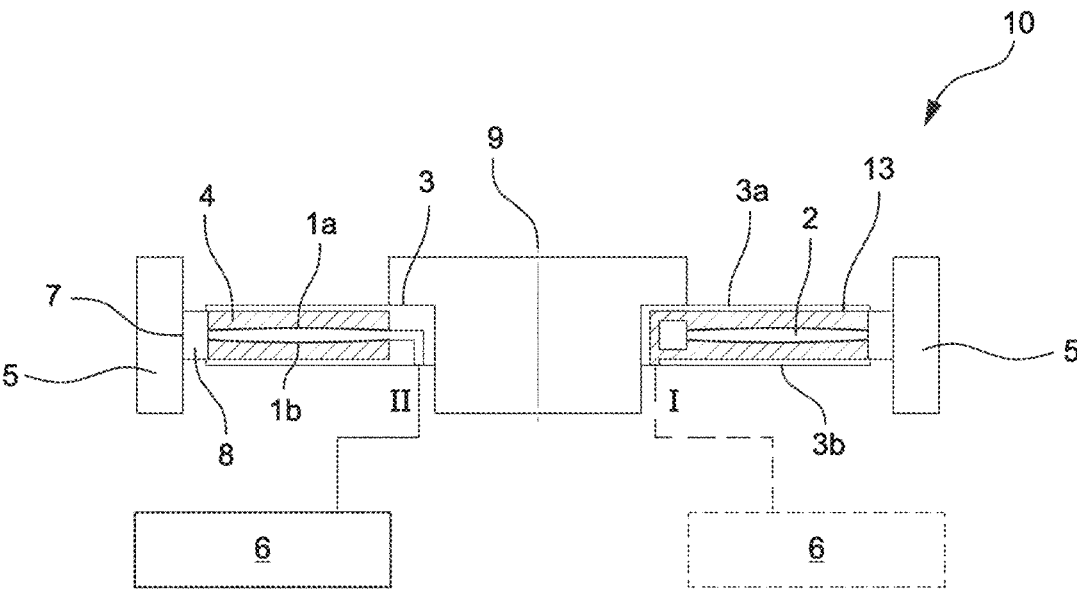
FIG. 1B shows a schematic cross section through an outwardly directed, passive pneumatic clamping and/or braking device according to the invention in the closed state.
Figure 4A:
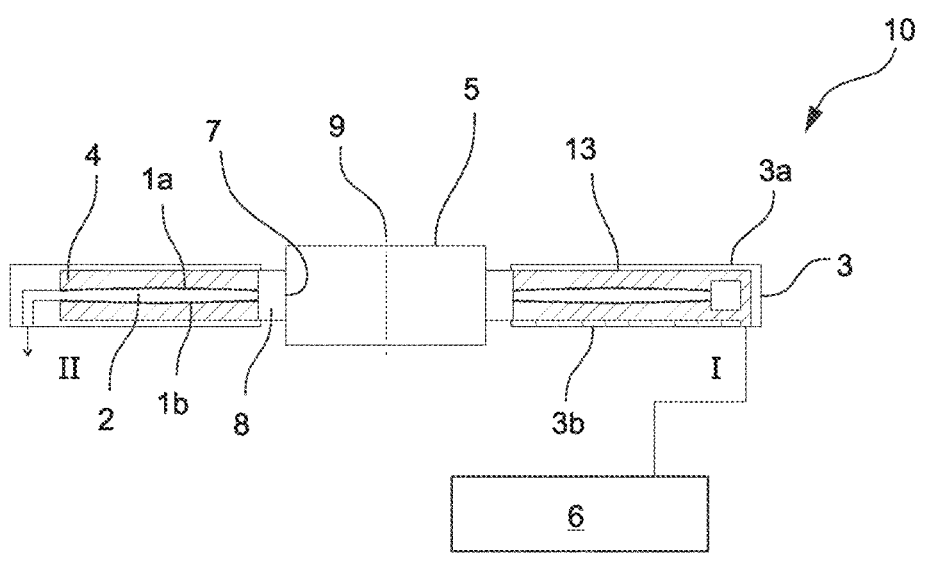
FIG. 4A shows a schematic cross section through an inwardly directed, active pneumatic clamping and/or braking device according to the invention in the closed state.
Figure 4B:
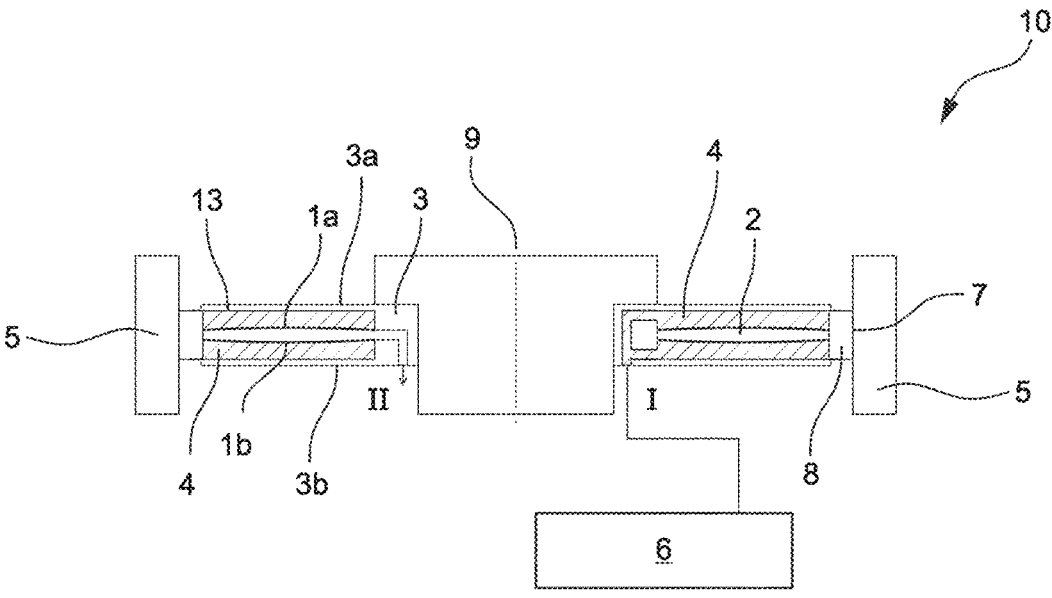
FIG. 4B shows a schematic cross section through an outwardly directed, active pneumatic clamping and/or braking device according to the invention in the closed state.

The clamping device 10 can be formed rotationally symmetrical about this main axis 9. The main axis 9 can run approximately or precisely centrally through an opening of the clamping device 10 (opening 14 in FIG. 5B). In FIGS. 1A, 4A, the object 5 to be clamped, for example a rotatable shaft of a machine or a table, is placed within the opening 14 and the clamping force of the clamping device is therefore directed within the clamping plane radially inwards towards the main axis 9 (perpendicular to the main axis 9). In FIGS. 1B, 4B, the object 5 to be clamped is placed outside the clamping device 10 and the clamping force of the clamping device is therefore directed within the clamping plane radially outwards away from the main axis 9 (perpendicular to the main axis 9).

In FIGS. 1A, 2A, 3A, 4A, the clamping element 8 is located between spring 1 and opening 14 or main axis 9. In FIGS. 1B, 2B, 3B, 4B, on the other hand, the object 5 to be clamped at least partially surrounds the clamping device 10, so that the clamping element 8 is located there between object 5 and opening 14 or main axis 9. In FIGS. 1B, 2B, 3B, 4B, instead of the object 5 to be clamped, a component which at least partially fills the opening 14 can be introduced into opening 14, through which component the main axis 9 extends.

In FIGS. 1A to 5A, the spring 1 is in each case clamped between two contact surfaces (101 and 102 in FIGS. 5C and 5D) within the housing 3 of the clamping devices 10 and extends between the two contact surfaces. In the pressureless initial state of the device 10 in FIGS. 1A to 2B, the spring 1 can be slightly bent in order to be fixed firmly in the housing 3 in this state and the same can apply to any other state of the device 10, the degree of bending of the spring 1 depending on the state in which the device 10 is located. If the device 10 is in a state in which the spring 1 is bent (e.g. more strongly bent than in the pressureless initial state, such as in the open state), deaerating of an inner pressure chamber 2 of the spring 1 and aerating of an outer pressure chamber 4 can lead to the at least partial relaxation of the spring 1 while the spring 1 presses against the radial contact surfaces, the distance between which increases somewhat, so that the housing 3 is thereby elastically deformed in the region of the clamping element 8 or the clamping surface 7 and the clamping surface 7 thereby touches the object 5 and is pressed against the object 5 with a (predefined) clamping force in order to clamp the object 5 firmly. The object 5 is clamped firmly and the clamping device 10 is in the closed state, as shown in FIGS. 1A and 1B. In the closed state of the device 10, the spring 1 can still be slightly bent even after the partial relaxation in order to be fixed firmly in the housing 3 in this state.

Here, the clamping element 8 can be an elastic element, such as a spring fork, which, in the pressureless initial state of the device 10, is brought by the spring force of the (slightly) bent spring 1 from an initial position, in which the elastic element is relaxed, into a relaxed position, for example by bending the spring fork 8, until an equilibrium between a restoring force of the elastic element 8 and the spring force of the spring 1 arises in the pressureless initial state. With this equilibrium, the clamping surface 7 can press against the object 5.

By additionally charging the outer pressure chamber 4 in the closed state with compressed air (for example at 4 bar or 6 bar), there is the optional possibility of increasing the clamping force by a predetermined value. This is indicated in FIGS. 1A, 1B by the optional additional compressed air pump (booster) 6 and the hatching (compressed air) in the outer pressure chamber 4. The outer pressure chamber 4 can be connected by means of an opening in the housing 3 to an air connection I (also referred to as "close"), to which the compressed air pump 6 can be connected.

As a result, for example, an actuation of the device 10 is possible such that a change takes place between a braked movement (in the pressureless state) of the charged object 5 and a complete clamping of the object (in the case of a sufficient pressure charging).

Even if two pressure chambers 2, 4 are shown and described here by way of example, the clamping device 10 can also be operated with a single pressure chamber which can be, for example, the inner pressure chamber 2 or the outer pressure chamber 4.

Figure 2A:
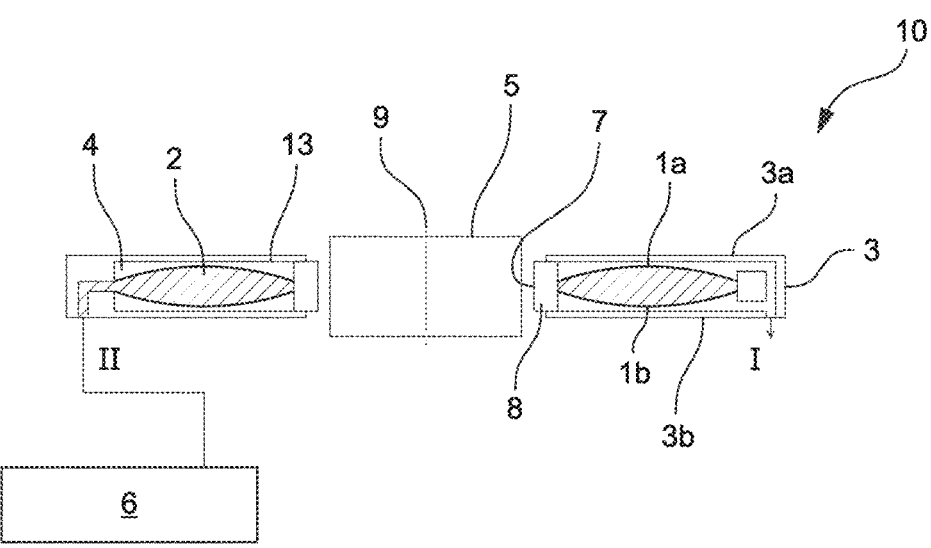
FIG. 2A shows a schematic cross section through an inwardly directed, passive pneumatic clamping and/or braking device according to the invention in the open state.
Figure 2B:
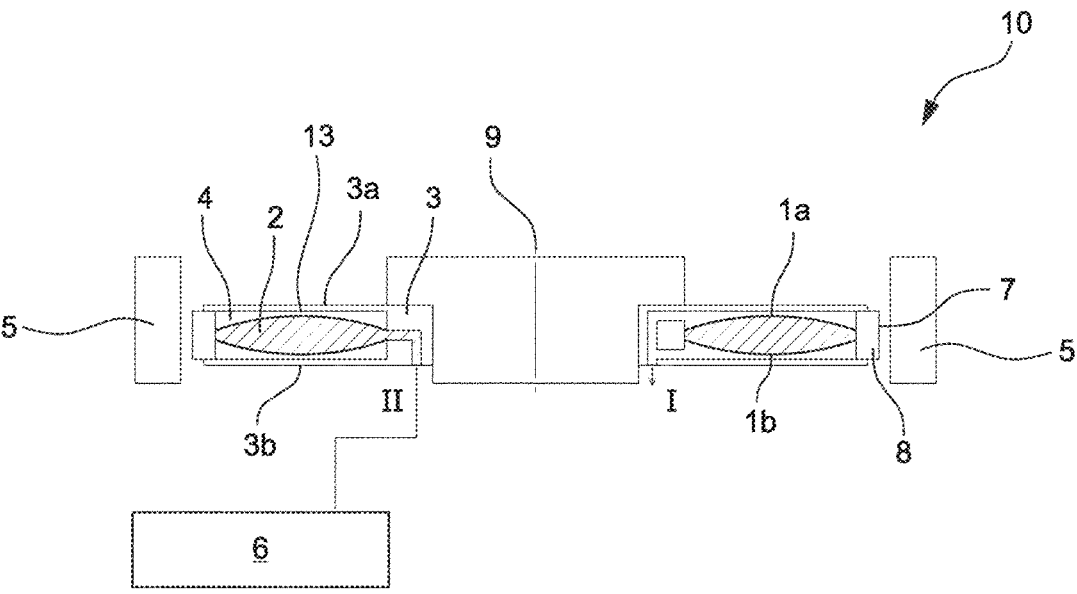
FIG. 2B shows a schematic cross section through an outwardly directed, passive pneumatic clamping and/or braking device according to the invention in the open state.
Figure 3A:
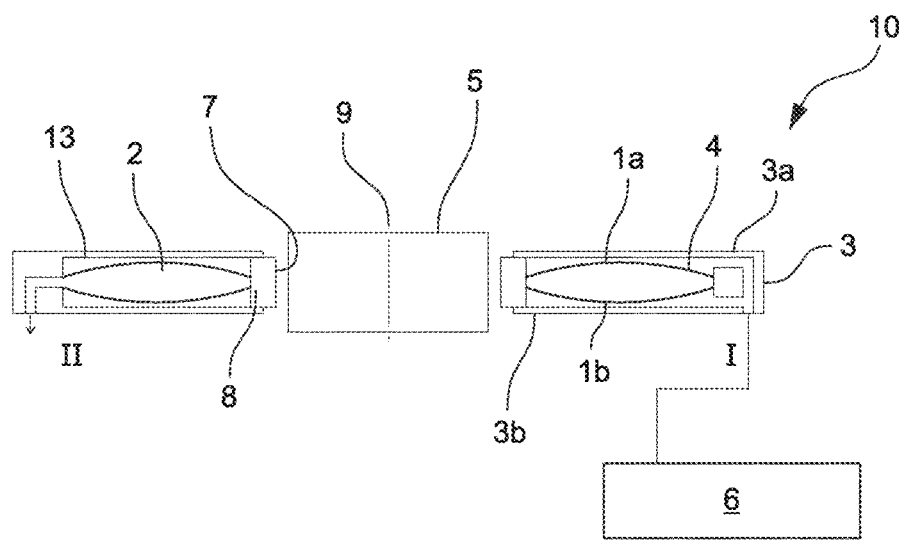
FIG. 3A shows a schematic cross section through an inwardly directed, active pneumatic clamping and/or braking device according to the invention in the open state.
Figure 3B:
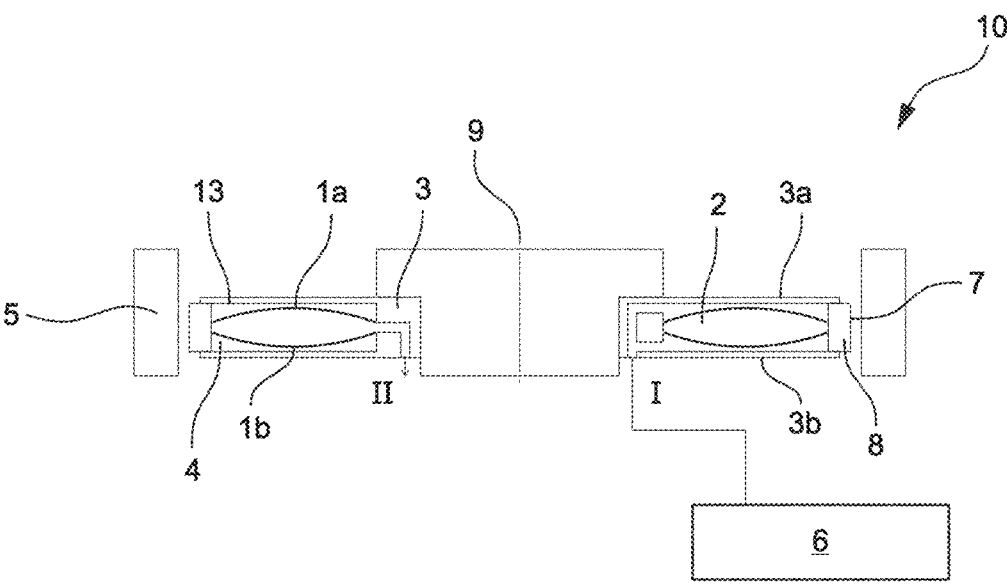
FIG. 3B shows a schematic cross section through an outwardly directed, active pneumatic clamping and/or braking device according to the invention in the open state.

FIGS. 2A and 2B show the clamping devices 10 from FIGS. 1A and 1B in each case in the open state in which the clamping surface 7 does not touch the circumference of the object 5 or is spaced apart from the circumference of the object 5. The inner pressure chamber 2 can be connected by means of an opening in the housing 3 to an air connection II (also referred to as "open"), to which a compressed air pump 6 can be connected.

By charging the inner pressure chamber 2 by the compressed air pump 6 with compressed air (for example 4 bar or 6 bar) and deaerating the outer pressure chamber 4, the spring 1, compared with the closed state from FIGS. 1A, 1B, is bent or tensioned more strongly (convexly) and a radial shortening of the spring 1 or of the spacing between the two contact surfaces occurs. The clamping surface 7 lifts off from the object 5 in order to cancel the clamping. The object 5 is freely movable (for example rotatable about axis 9 or linearly movable along axis 9) and the clamping device 10 is open.

It is possible to change back and forth between the closed state and the open state of the device 10.

Such pneumatic clamps 10 have a series of advantages over hydraulic clamps.

By using the combination of elastic component, in this case a spring 1 together with elastic elements 1a, 1b, and compressed air, for example very short reaction times are achieved during the changeover between the open and closed state and a secure clamping of the object 5 is likewise brought about. The spring 1 can preferably be formed plate-shaped, as shown in more detail in FIG. 5, wherein two elastic elements 1a, 1b resting on one another form the spring 1 and the inner pressure chamber 2 of the spring 1 between the plates 1a, 1b. The plates 1a, 1b can likewise be annular, as shown in FIG. 5, and can optionally additionally have radial slots, such that a change in the inner diameter is possible with particularly low forces. The elastic elements 1a, 1b can be coated with rubber, at least in the region of slots, to produce the sealing required for the compressed air. The elastic elements 1a, 1b are generally formed so pressure-resistant and so elastically bendable and arranged in the housing 3 of the clamping device 10 such that the inner pressure chamber 2 is formed within the spring 1 between the elastic elements 1a, 1b and the outer pressure chamber 4 is formed between each elastic element 1a, 1b and the housing 3 or the housing parts 3a, 3b of the clamping device 10. FIG. 5 shows a three-dimensional view of a clamping device 10 similar to FIGS. 1A and 2A.

By aerating or charging with compressed air the outer pressure chamber 4 and deaerating the inner pressure chamber 2, as shown in FIG. 1A, the spring 1 is at least partially relaxed and brings about a clamping force on the object 5 to be clamped, in particular on the circumference of a shaft 5. In the event of energy or pressure failure, the object 5 is thereby clamped or the shaft 5 is immediately brought to a standstill and therefore offers a safety clamping. Depending on the size, such pneumatic clamps 10 can achieve holding moments of several 100 Nm and up to several 1000 Nm, which can be further increased by additionally charging the outer pressure chamber 4 with compressed air, as indicated in FIG. 1A by a pressure pump 6 (booster). In this case, a compressed air of a few bar (for example 4 bar or 6 bar) is sufficient for providing a multiple of the holding moments which are achieved without a booster. In this case, the fact is used that small transverse bending of the plates 1a, 1b (perpendicular to their longitudinal axis) during the change-over between the open and closed state of the clamp 10 generate large spring forces which can be used for clamping or for releasing prestressed clamping devices 10. Reliable clamping and releasing of rapidly rotating machine shafts 5 is thus also made possible.

In the case of pneumatic material, the costs and the assembly outlay are also lower in comparison with the hydraulic material and no additional outlay for producing cleanliness on the system arises by using compressed air. Such pneumatic clamps also allow a small overall size, since a small transverse bending and a small (changes in) longitudinal extent of the spring, and thereby small volumes of the pressure chambers, are sufficient to apply the required clamping forces.

In the case of pneumatic clamps, a distinction is made in principle between passive clamping devices 10, as shown in FIGS. 1A to 2B, and active clamping devices 10, as shown in FIGS. 3A to 4B.

The spring 1 can be bent to different extents (transversely) in the pressureless initial state and can thus be shortened radially to different extents. The inner side of the housing 3 can be adapted to the bending of the elastic elements 1a, 1b or can define the latter. A corresponding stop surface for the elastic elements 1a, 1b can be formed, for example, by a housing inner wall. The housing inner wall can be formed complementary (for example concavely) to a (for example convex) bending of the elastic elements 1a, 1b.

In the case of passive clamping devices 10, the spring 1 is generally bent or prestressed slightly elastically (for example convexly) in the pressureless initial state and the clamping devices 10 can be closed (FIGS. 1A, 1B). The clamping device 10 is opened only by the action of force from the inside via charging the inner pressure chamber 2 with compressed air (FIGS. 2A, 2B). In most cases, the spring 1 is bent somewhat in the pressureless initial state, with the result that, in the case of clamping or in the case of a pressure drop, the spring force given by the energy stored in the spring 1 is transmitted to the object 5 to be clamped as a clamping force in order to clamp the object 5.

In the case of active clamping devices 10, the spring 1 is bent more strongly, in particular more convexly, transversely outward in the pressureless initial state (FIGS. 3A, 3B) than in the case of passive clamping devices, with the result that the spacing between the two radial contact surfaces is shortened and the clamping device 10 is open. No clamping force is brought about via clamping surface 7 on the object 5. The object is free since the clamping surface 7 does not touch the object 5 or is spaced apart from the object 5.

By plastic deformation of the elastic elements 1a, 1b, the spring 1 can be bent more strongly transversely outward in the pressureless initial state and can thus be shortened more strongly radially in the same housing 3 than in the case of passive clamping devices. This smaller radial extent of the elastic elements 1a, 1b in the pressureless initial state can lead to an open state of the clamping device 10 in the pressureless initial state. Even in the case of plastic deformation, the elastic elements 1a, 1b are elastically bent and press against the contact surfaces with the result that the spring is fixed in the housing. The inner space of the housing or the recesses can accommodate the curvature brought about more strongly by plastic deformation in the initial state.

The clamping force must now be actively induced from the outside, as shown in FIGS. 4A and 4B, in order to transfer the clamp into the closed state. Here, compressed air is introduced into the outer pressure chamber 4 by a compressed air pump 6 and the spring 1 is thus charged with compressed air from the outside in such a way that the spring 1 is actively relaxed, the curvature of the spring 1 is reduced, the distance between the two contact surfaces is increased, and the housing 3 is elastically deformed in the region of the clamping element 8 or the clamping surface 7, so that the clamping surface 7 touches the object 5 and brings about a clamping force on the object 5 and the object 5 is thereby clamped firmly. The active clamping device 10 is then in the closed state.

Depending on the field of application and prescribed safety regulations, use is therefore made of an active or passive clamping system 10. If primarily a safety clamping is desired, a passive clamping device is generally used. With such pneumatic passive clamping systems, it is possible to generate a predetermined clamping force already in the pressureless state during a corresponding mounting of the device in an overall device, with which clamping force the object 5 to be clamped is charged. By charging with over-pressure or negative pressure, the forces transmitted to this object can be increased, reduced or completely eliminated, which opens up a wide variety of applications. If, on the other hand, a deliberate work operation, such as a tool change, is to be carried out primarily with the clamping device, an active clamping device is generally used.

As illustrated in FIG. 5A, the housing 3 of the clamping devices 10 according to the invention comprises two housing parts 3a, 3b which are fastened to each other with fastening means, such as screws, and are mounted such that in the mounted state the two housing parts 3a, 3b define the inner space 13 between the housing parts 3a, 3b within the housing 3 in which the spring 1 together with its annular elastic elements 1a, 1b according to the invention are arranged. The housing parts 3a, 3b respectively define a recess 11 which is likewise annular and which serves for receiving the annular elastic elements 1a, 1b, as illustrated in FIGS. 5A to 5D. At least a part of the first contact surface 101 of the housing part can run (substantially) perpendicular to the radial direction R of the annular recess 11 and/or a part of the second contact surface 102 of the housing part can run (substantially perpendicular) to the radial direction R of the annular recess 11.

An opening 14 (FIG. 5B) into which the object 5 to be clamped, such as a shaft, can be introduced extends through the center of the housing 3. The housing can extend up to 360° around this opening and at least partially surrounds the object 5 in at least one plane which is referred to as the clamping plane. The central main axis 9 of the clamping devices runs centrally through the opening 14 and perpendicular to the clamping plane. In clamping devices according to FIGS. 1A, 2A, 3A, 4A, 5A, the main axis 9 runs centrally through the shaft along its longitudinal axis.

Along the circumference of the housing 3 or the opening 14 there is located one or more of the clamping surfaces 7 which, in the case of elastic deformation of the housing 3 in the region of the clamping element 8 or the clamping surface 7, brings about the clamping force on the outer circumference of the object 5 and can thereby clamp the object 5. For effective opening and closing of the clamping device 10 with respect to the object 5 to be clamped, without the risk of damage to the object 5, a symmetrical distribution of the clamping force along the clamping surface 7 or along the circumference of the object 5 is desirable. A non-symmetrical distribution of the clamping force can lead to damage to the object 5. Preferably, one or both contact surfaces 101, 102 are formed circular within the clamping plane. Preferably, the clamping surface 7 is formed circular within the clamping plane. The clamping element 8 can be formed annular. All annular or circular components described here can respectively have, individually or in combination, as the centre point, the point of intersection of the main axis 9 with the clamping plane (e.g. centre point of the opening 14).

FIG. 5B shows an embodiment of the component according to the invention. The component comprises the annular elastic element 1a according to the invention and a housing part (here the upper housing part 3a from FIG. 5A), the housing part 3a having an annular recess 11 for clamping the annular elastic element 1a, and the housing part 3a having an inner surface defined by the recess 11 (cf. 105 in FIG. 7). The annular recess 11 preferably defines an annular opening 12 in the housing part, the annular opening being formed between a first annular edge 12a of the housing part and a second annular edge 12b of the housing part. The elastic element 1a is clampable between the first annular edge 12a and the second annular edge 12b.

When the elastic element 1a is introduced with the first side surface (cf. 16c in FIG. 6C) facing the inner surface through the opening 12 into the recess 11 and clamped in the recess 11, the first pressure space 4 is formed between the inner surface and the elastic element 1a. The elastic element according to the invention in this case has the means mentioned in the introduction which allow reliable use of the component in a humid environment. These means are explained in more detail in connection with FIGS. 6 to 12.

As shown in FIGS. 5C and 5D, the illustrated elastic element 1a of the spring 1 extends from a first contact surface 101 within the housing part 3a to a second contact surface 102 within the housing part 3a and can touch the latter. The first contact surface 101 in this case is arranged radially further outwards than the second contact surface 102 as seen from the centre point of the opening 14.

FIG. 5C shows the section of the housing part 3a illustrated in FIG. 5B in which the upper plate 1a of the spring 1 meets the first contact surface 101 and is preferably in contact with the latter. FIG. 5D shows the section of the housing part 3a illustrated in FIG. 5B in which the upper plate 1a of the spring 1 meets the second contact surface 102 and is preferably in contact with the latter. However, it is also possible for one or more further components to be located in each case radially between the elastic element 1a and one or more of the contact surfaces 101, 102, via which further components the elastic element 1a exerts its spring force on the contact surfaces 101, 102.

As can be seen in FIGS. 5B, 5D, the elastic element 1a is clamped in the recess 11 between inner sides of the housing part 3a. Each of the plates of the spring 1 is introduced in the direction of the main axis 9 of the clamping devices 10 through the opening 12 into the recess 11 of the respectively associated housing part during the mounting along inner surfaces of the housing part 3a until the respective plate abuts against a stop 112, 122 at the end of each of the two contact surfaces 101, 102 and therefore cannot be introduced further into the recess 11. Since the extent of the elastic element 1a in the clamping plane or in the radial direction of the annular recess can be greater than the extent of the inner space defined by the housing part, the plate 1a can be bent or prestressed in the pressureless initial state.

Figures 6A, 6B, 6C, 7:
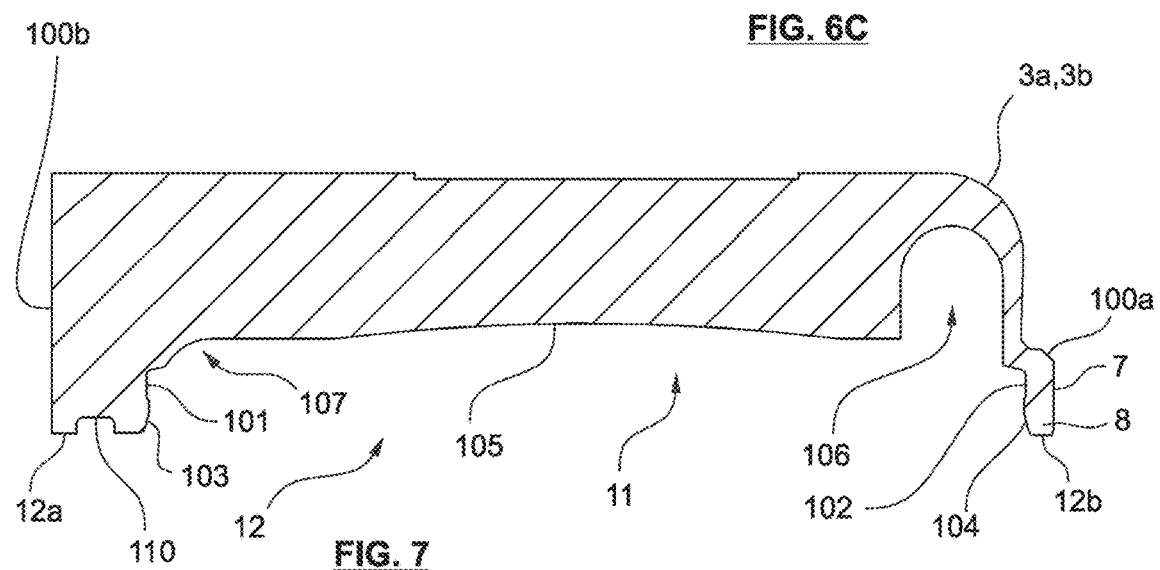
FIGS. 6A to 6C show an embodiment of the elastic element according to the invention.
FIG. 7 shows a section through a variant of a housing part of a component or device according to the invention.

In the drawings of FIGS. 6A to 6C, embodiments of the means of the elastic element according to the invention for use in humid environments and the optional means for use in a vacuum or clean room are illustrated in more detail.

FIG. 6A shows an annular elastic element 1a, 1b according to the invention for a clamping and/or braking device 10, the element 1a, 1b comprising: an annular spring plate 16, the annular spring plate 16 having a first annular side surface 16c and a second annular side surface 16d; a first sealing element 17, the first sealing element 17 being arranged on the first side surface 16c of the spring plate 16; a second sealing element 15, the second sealing element 15 being arranged on the second side surface 16d of the spring plate 16, and the second sealing element 15 forming an inner projection 15a in a region of an inner edge 16a of the annular spring plate 16 and forming an outer projection 15b in a region of an outer edge 16b of the annular spring plate 16, the first sealing element 17 forming a first projection 17a.

FIGS. 6B and 6C show that the first projection 17a is formed between the inner 16a and outer edge 16b of the annular spring plate 16; here, by way of example, the first projection 17a is formed in a region of the inner 16a or outer 16b edge of the annular spring plate 16.

FIGS. 6A and 6B further show that the first sealing element 17 forms an optional second projection 17b, preferably in a region of the outer edge 16b of the annular spring plate 16, on the first side surface 16c.

Each of the projections 15a, 15b, 17a, 17b of the first and/or second sealing element 15, 17 can be at least sectionally annular and extend annularly about the axis 9. Each of the projections 15a, 15b, 17a, 17b of the first and/or second sealing element 15, 17 can respectively be fixed, preferably vulcanised, to the spring plate 16 or be arranged detachable from the spring plate 16, preferably as an O-ring.

FIGS. 6A and 6C additionally show that a longitudinal axis of the first projection 17a of the first sealing element 17 is (substantially) perpendicular to the first side surface 16c of the spring plate 16.

As shown in FIGS. 6B and 6C, the inner projection 15a and/or outer projection 15b of the second sealing element 15 respectively have an at least sectionally planar surface 15e, 15f which serves as a bearing surface, for example with respect to an (inner) housing wall or another elastic element, in order thus to delimit and seal the second pressure chamber 2. It is additionally shown in these figures that the inner and/or outer projection 15a, 15b of the second sealing element 15 respectively forms at least sectionally a radially extending bulge 15c, 15d.

The bulge 15d of the outer projection 15b of the second sealing element 15, as shown in FIG. 6B, preferably extends radially outwards, preferably radially outwards beyond the outer edge 16a of the spring plate 16. The bulge 15d is preferably neighboring or adjacent to the planar surface 15f. The planar surface 15f preferably merges into the bulge 15d.

The bulge 15c of the inner projection 15a of the second sealing element 15, as shown in FIG. 6C, preferably extends radially inwards, preferably radially inwards beyond the inner edge 16a of the spring plate 16. The bulge 15c is preferably neighboring or adjacent to the planar surface 15e. The planar surface 15e preferably merges into the bulge 15c.

The first sealing element 17 and/or the second sealing element 15 can be individually or both made of an elastic material, preferably of rubber or another suitable material, which is fixed (e.g. vulcanised) on the spring plate 16.

FIG. 7 shows a housing part 3a, 3b of a component or device according to the invention, wherein the housing part 3a, 3b is an advantageous further development of the housing part 3a from FIG. 5B. In addition to the inner surface 105, the recess 11, the first contact surface 101 and the second contact surface 102, the housing part also has advantageous and preferred adaptations.

When the elastic element 1a, 1b is clamped with the first side surface 16c facing the inner surface 105 in the recess 11, the first projection 17a of the first sealing element 17 will make a preferably sealing contact with a first portion of the inner surface 105 of the housing part 3a, 3b. The first portion can have a recess or depression 106 of the housing part 3a, 3b. Preferably, the surface shapes of the first projection 17a and of the first portion 106 are at least partially complementary to make a particularly effective sealing contact. When the elastic element 1a, 1b is clamped with the first side surface 16c facing the inner surface 105 in the recess 11, the second projection 17b of the first sealing element 17 will make a preferably sealing contact with another portion of the inner surface 105 of the housing part 3a, 3b. This other portion can have a recess or depression 107 of the housing part 3a, 3b. Preferably, the surface shapes of the second projection 17b and of the portion 107 are at least partially complementary to make a particularly effective sealing contact. A fluidic connection between the first pressure chamber 4 and the environment of the housing, in particular in the region of the transition of two adjacent housing parts 3a, 3b, is inhibited or completely prevented by each of the two projections 17a, 17b.

The housing part 3a, 3b can comprise an annular recess 11 for clamping the annular elastic element 1a, 1b, wherein the recess 11 forms a first annular edge 12a and a second annular edge 12b of an annular opening 12 of the housing part 3a, 3b, wherein the annular recess 11 defines an inner surface 105 of the housing part 3a, 3b between the first annular edge 12a and the second annular edge 12b, wherein the inner surface 105 forms a first slope 103 (or long chamfer) in the region of the first annular edge 12a and the inner surface 105 forms a second slope 104 (or long chamfer) in the region of the second annular edge 12b, wherein the slopes 103, 104 are oriented such that the annular opening 12 increases towards the first and second edges 12a, 12b.

The inner surface 105 can form a first abutment surface 101 and a second abutment surface 102, which are formed to clamp therebetween the spring plate 16 of the elastic element 1a, 1b according to the invention, wherein the first slope 103 is arranged between the first abutment surface 101 and the first annular edge 12a and wherein the second slope 104 is arranged between the second abutment surface 102 and the second annular edge 12a. When the elastic element 1a, 1b is clamped with the first side surface 16c facing the inner surface 105 in the recess 11, the bulges 15c, 15d are preferably brought into sealing contact with the slopes 103, 104.

As shown in FIG. 7, the first abutment surface 101 can form a first slope 103 (or long chamfer) or merge into them and/or the second abutment surface 102 can form a second slope 104 (or long chamfer) or merge into them, wherein the slopes 103, 104 are each preferably oriented such that the annular opening 12 or the recess 11 increases towards the first and second edges 12a, 12b (cf. FIGS. 7 and 5B). It is largely avoided by each of these slopes 103, 104 that a force bending the clamping element 8 is transmitted by the second sealing element 15 to the clamping element 8, but rather the spring plate 16 or the inner edge 16a primarily transmits the force transmission for clamping or braking the object 5 to the clamping element 8 and the clamping surface 7. This protects the second sealing element 15 makes the process of opening and closing the device more reliable.

In order to now ensure an additional preferred seal for use in a humid environment and/or in a vacuum environment or in a clean room, the bulges 15c, 15d are provided, which fill the space at the slopes and come into contact with the slopes 103, 104. The bulges 15c, 15d are advantageous for sealing the first pressure chamber 4 against the gap at the transition of the clamping elements 8 of adjacent housing parts 3a, 3b. The bulges at the housing edge with the slope 103, 104 are advantageous for the fact that, during operation of the first pressure chamber 4, hardly any medium or no medium flows in or out via the housing edge.

The planar surfaces 15e, 15f firstly increase the resistance to the permeability of a pressure medium (in particular gases) when the pressure medium is applied to the second pressure chamber 2. The planar surfaces 15e, 15f reduce or prevent the overflow of a medium between the first pressure chamber 4 and the second pressure chamber 2. The planar surfaces 15f and 15e additionally support the displacement of the bulges 15c, 15d against the slopes 103, 104 on the housing and thus the above-described effects of the bulges. This support is particularly pronounced when, as described in connection with FIGS. 6B and 6C, the planar surface 15e or 15f is adjacent and/or merges into the associated bulge 15c or 15d. The planar surfaces and the respectively associated bulges thus form a combination of features which interact synergistically, but can be present individually. For the consideration of vacuum operation, each of the sealing elements 17a and 17b is to be considered as an additional barrier and supports the seal of the first pressure chamber 4 against the environment.

The housing part 3a, 3b can have a, preferably circular, groove or nut 110 for receiving an O-ring. The groove or nut 110 can preferably completely surround the housing part 3a, 3b along the circumference of the housing part in the region of the first annular edge 12a, or between an outer edge 100b of the housing part and the first abutment surface 101 or the recess 11. As an alternative or in addition, the groove or nut 110 can preferably completely surround the housing part 3a, 3b along the circumference of the housing part in the region of the second annular edge 12a, or between an inner edge 100a of the housing part and the second abutment surface 102 or the recess 11.

The housing part is preferably made of a low-corroding material.

Figures 8, 9, 10:
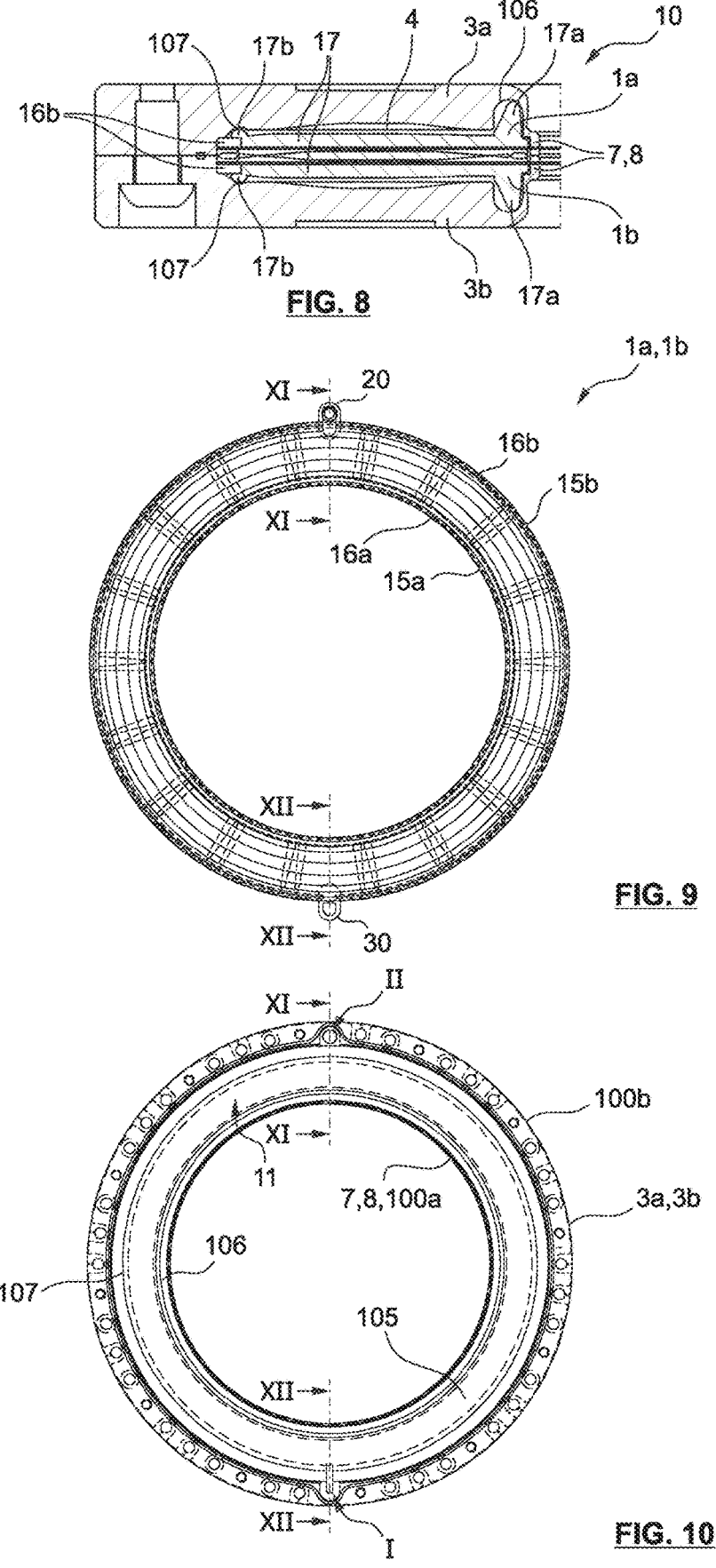
FIG. 8 shows a cross section made perpendicular to the clamping plane through a device according to the invention.
FIG. 9 shows a top view of an elastic element according to the invention.
FIG. 10 shows a top view of a variant of a housing part of a component or device according to the invention.

FIG. 8 shows an inventive clamping and/or braking device 10. In FIG. 8, by way of example, a device 10 with an inwardly directed clamping action is shown as in FIGS. 1A, 2A and 5A.

In FIG. 8, the first projection 17a of the first sealing element 17 of at least one of the elastic elements 1a, 1b makes a preferably sealing contact with a first portion (e.g. 106) of the inner surface 105 of one of the housing parts 3a, 3b to thereby at least inhibit a flow connection between a region of the first pressure chamber 4 and a transition between the housing parts 3a, 3b. The contact can be at least partially sealing against a medium, preferably a fluid or a liquid, which enters the housing 3 from outside the device 10 through the gap at the transition of the housing parts 3a, 3b or clamping elements 8.

The region of the first pressure chamber 4 is arranged in FIG. 8 between the first projection 17a of the first sealing element 17 of the at least one elastic element 1a, 1b and the outer edge 16b of the spring plate 16 of the at least one elastic element 1a, 1b, or the second projection 17b of the first sealing element 17 of the at least one elastic element.

The optional second projection 17b of the first sealing element 17 of at least one of the elastic elements 1a, 1b makes a contact with a second portion (e.g. 107) of the inner surface 105 of the housing part 3*a*, 3*b*, wherein the second portion of the inner surface 105 preferably lies between the first abutment surface 101 and the second abutment surface 102 of the housing part 3*a*, 3*b*. This projection can also reduce the fluidic connection of the first pressure chamber 4 to the region outside the clamping element 8. The inner surface 105 can have one or more indentations or depressions 106, 107, wherein the indentation or depression 106, 107 is preferably complementary in shape to the surface of the projection 17*a*, 17*b* contacting it.

It can be seen from the combination of FIGS. 6, 7 and 8 that the first abutment surface 101 of each housing part 3*a*, 3*b* forms the first slope 103 and the second abutment surface 102 of each housing part 3*a*, 3*b* forms the second slope 104, wherein the bulge 15*c* of the inner projection 15*a* of the second sealing element 15 of the first elastic element contacts the second slope 104 of the second abutment surface 102 of the housing part 3*a*, 3*b*, and wherein the bulge 15*d* of the outer projection 15*b* of the second sealing element 15 of the first elastic element contacts the first slope 103 of the first abutment surface 101 of the housing part 3*a*, 3*b*.

The first elastic element 1*a* and the second elastic element 1*b* are clamped in the inner space 13 in FIG. 8 such that the planar surfaces 15*e* of the inner projections 15*a* of the second sealing element 15 of the elastic elements 1*a*, 1*b* contact each other and/or the planar surfaces 15*f* of the outer projections 15*b* of the second sealing elements of the elastic elements 1*a*, 1*b* contact each other, so as to delimit the second pressure chamber 2 and seal it in particular during its charging with pressure medium.

FIG. 9 shows an embodiment of the elastic element 1*a*, 1*b* according to the invention with a first connection seal 30 and/or a second connection seal 20.

The annular spring plate 16 can be arranged between a section of the second connection seal 20 and a section of the first connection seal 30. The first connection seal 30 and the second connection seal 20 can be arranged at opposite sections of the inner edge 16*a* or outer edge 16*b* of the annular spring plate 16.

The first connection seal 30 and/or the second connection seal 20 can respectively be made of an elastic material, preferably of rubber.

The first connection seal 30 can be arranged at least sectionally radially inwards or outwards offset to the inner edge 16*a* and/or outer edge 16*b* (cf. FIG. 9) of the spring plate 16 of the elastic element 1*a*, 1*b*. The first connection seal 30 can be part of the first sealing element 17 and/or the second sealing element 15. The first connection seal 30 can rise up in the radial direction beyond the inner edge 16*a* or the outer edge 16*b* (cf. FIG. 9).

The second connection seal 20 can be arranged at least sectionally radially inwards or outwards offset to the inner edge 16*a* and/or outer edge 16*b* (cf. FIG. 9) of the spring plate 16 of the elastic element 1*a*, 1*b*. The second connection seal 20 can be part of the first sealing element 17 and/or the second sealing element 15. The second connection seal 20 can rise up in the radial direction beyond the inner edge 16*a* or the outer edge 16*b* (cf. FIG. 9).

Figure 11:
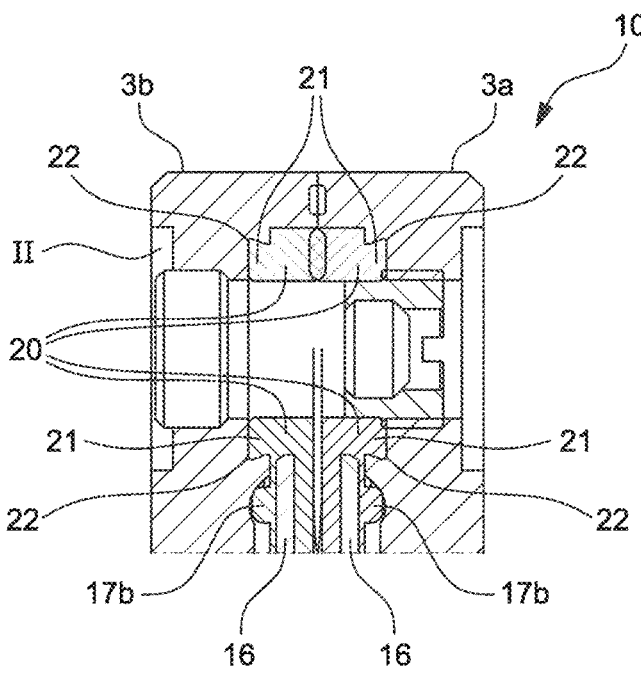
FIG. 11 shows a detail in the region of the second connection seal of a cross section made perpendicular to the clamping plane of an embodiment of a device according to the invention corresponding to the position of the sections XI indicated in FIGS. 9 and 10 through the elastic element and the housing part.
Figure 12:
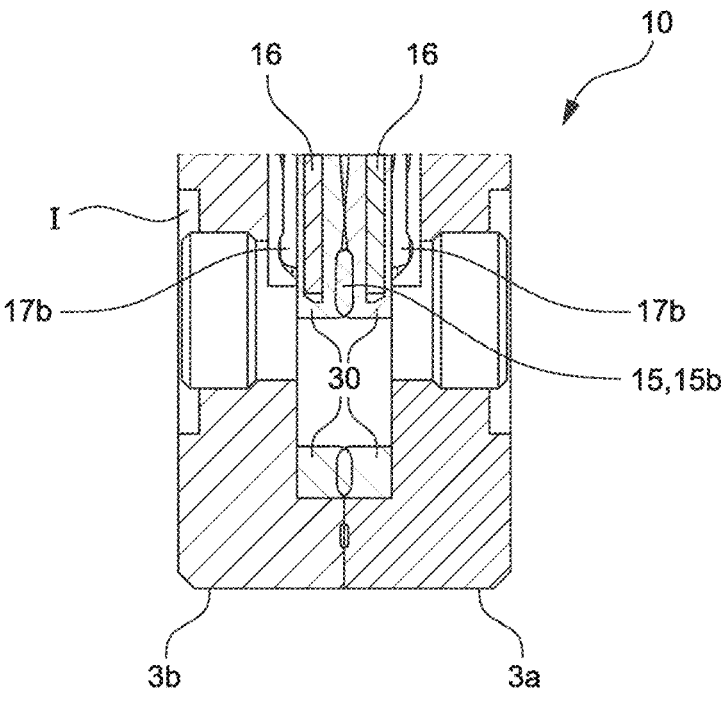
FIG. 12 shows a detail in the region of the first connection seal of a cross section made perpendicular to the clamping plane of an embodiment of a device according to the invention corresponding to the position of the sections XII indicated in FIGS. 9 and 10 through the elastic element and the housing part.

FIGS. 11 and 12 each show a detail of the cross section of the device 10 according to the invention. The left half and the right half of FIGS. 11 and 12 each show a cross section of the elastic element 1*a*, 1*b* according to the invention according to FIG. 9 installed in the housing part 3*a*, 3*b* according to FIG. 10. Here, the elastic element 1*a*, 1*b* is clamped in the recess 11 between the inner edge 100*a* (or clamping element 8 with clamping surface 7) and the outer edge 100*b* of the housing part 3*a*, 3*b* in such a way that the first connection seal 30 comes into contact with the region of the housing part 3*a*, 3*b* for the first port I and the second connection seal 20 comes into contact with the region of the housing part 3, 3*b* for the port II. This is carried out twice, so that two components according to the invention are produced, which are then fastened to each other, as shown in FIGS. 11 and 12.

The detail of the cross section of the device 10 shown in FIG. 11 corresponds in its position to the sections XI indicated in FIGS. 9 and 10 through the elastic element 1*a*, 1*b* and the housing part 3*a*, 3*b* in the region of the second connection seal 20. The second port seal 20 has an edge along a second port opening, the edge serving for sealing the second port II of the clamping and/or braking device 10 for applying a pressure medium to the second pressure chamber 2 of the clamping and/or braking device 10. The second port seal 20 along the edge of the second port opening forms a port projection 21 which at least partially and preferably completely surrounds the second port opening.

The port projection 21 of the second port seal 20 at least sectionally forms an undercut 22 at the edge of the second port opening in order to intensify the sealing in particular with respect to the escape of pressure medium into the environment. The undercut 22 of the second port seal 20 reduces the risk of lifting the second port seal 20 from the planar housing surface, especially when applying pressure to the first pressure chamber 4. In addition, the use of sealing compound (adhesive) at this point can be avoided by the undercut 22. Such a sealing compound could have a negative effect on the vacuum or clean room.

The second port seal 20 can form part of the inner or outer projection 15*a*, 15*b* of the second sealing element 15. The part of the projection of the second sealing element 15 formed by the second port seal 20 can be arranged on a side of the second port opening 20 facing away from and/or opposite a side of the second port opening 20 at which the port projection 21 is formed by the second port seal 20.

The detail of the cross section of the device 10 shown in FIG. 12 corresponds in its position to the sections XII indicated in FIGS. 9 and 10 through the elastic element 1*a*, 1*b* and the housing part 3*a*, 3*b* in the region of the first port seal 30. The first port seal 30 has an edge of a first port opening, the edge serving for sealing the first port I of the clamping and/or braking device 10 for applying a pressure medium to the first pressure chamber 4 of the clamping and/or braking device 10. The edge of the first port seal 30 at least partially and preferably completely surrounds the first port opening.

The first port seal 30 can comprise an O-ring which surrounds the first port opening. The bulge 15*d* of the projection 15*b* with the slope 103 together with the first port seal 30 at the port I ensure that, during application to the first pressure chamber 4, no fluids flow in or out via the housing edge. In addition, undesirable sealing compounds (adhesive) between the housing halves can thereby be dispensed with. Such a sealing compound could have a negative effect on the vacuum or clean room.

By means of the means described here individually and in combination, clamps can be provided which can be reliably operated in humid environments and, in addition, can optionally also additionally be operated in a vacuum or in a clean room without the dynamics of the opening and closing of the clamp being adversely impaired as a result.

In the description and in the figures, preferred embodiments of the subject matter claimed by the appended claims are described. The optional features disclosed in the above description, the claims and the drawings can be used both individually and in any combination for the embodiment of the subject matter claimed here in accordance with the appended claims in their various embodiments.

The various aspects and embodiments described above can be combined to provide yet further embodiments. These and other changes can be made to the embodiments in light of the above detailed description. In general, the terms used in the following claims should not be construed to limit the claims to the specific aspects and embodiments disclosed in the description and the claims, but should be construed to cover all possible embodiments together with the full scope of equivalents to which these claims are entitled.

The invention claimed is:

1. An annular elastic element for a clamping and/or braking device, the element comprising:
   an annular spring plate, the annular spring plate having a first annular side surface and a second annular side surface;
   a first sealing element, the first sealing element being arranged on the first side surface of the spring plate;
   a second sealing element, the second sealing element being arranged on the second side surface of the spring plate, and the second sealing element forming an inner projection in a region of an inner edge of the annular spring plate and forming an outer projection in a region of an outer edge of the annular spring plate;
   characterised in that the first sealing element forms a first projection, and in that the elastic element further comprises:
   a first port seal defining an edge of a first port opening of the first port seal, the edge being suitable for sealing a first port of the clamping and/or braking device for applying a pressure medium to a first pressure chamber of the clamping and/or braking device.

2. The elastic element according to claim 1, characterised in that the first projection is formed between the inner and outer edge of the annular spring plate.

3. The elastic element according to claim 1, characterised in that the first sealing element further forms a second projection.

4. The elastic element according to claim 1, characterised in that each of the projections of the first and/or second sealing element is at least sectionally annular.

5. The elastic element according to claim 1, characterised in that the first projection and/or the second projection of the first sealing element has an at least sectionally rounded surface.

6. The elastic element according to claim 1, characterised in that a longitudinal axis of the first projection of the first sealing element is perpendicular to the first side surface of the spring plate.

7. The elastic element according to claim 1, characterised in that the inner and/or outer projection of the second sealing element respectively has an at least sectionally planar surface.

8. The elastic element according to claim 1, characterised in that the elastic element further comprises: a second port seal defining an edge of a second port opening of the second port seal, the edge being suitable for sealing a second port of the clamping and/or braking device for applying a pressure medium to a second pressure chamber of the clamping and/or braking device.

9. A component for a clamping and/or braking device, the component comprising:
   the annular elastic element according to claim 1; and a housing part, the housing part having an annular recess for clamping the annular elastic element, and the housing part having an inner surface defined by the recess;
   wherein, when the elastic element is clamped with the first side surface facing the inner surface in the recess, the first projection of the first sealing element is adapted to make contact with a first portion of the inner surface of the housing part.

10. The component according to claim 9, wherein the elastic element is clampable between a first abutment surface of the housing part and a second abutment surface of the housing part, and wherein the first portion of the inner surface lies between the first abutment surface and the second abutment surface.

11. A clamping and/or braking device for clamping and/or braking an object to be clamped and/or braked, comprising:
   a first elastic element according to claim 1 and a second elastic element according to claim 1;
   a housing comprising a first housing part with an inner surface and a second housing part with an inner surface, wherein the housing parts are arranged relative to each other and fastened to each other such that the inner surfaces of the housing parts together delimit an inner space within the housing;
   one or more clamping elements, each clamping element having a clamping surface; and
   a spring arranged in the inner space comprising the first elastic element and the second elastic element, wherein the elastic elements are arranged within the inner space such that a first pressure space is formed in the inner space between the elastic elements and the inner surfaces of the housing parts, wherein the first pressure space is ventable and can be charged with overpressure of a pressure medium suppliable to the housing,
   wherein the first elastic element is clamped with its first side surface facing the inner surface of the first housing part in the inner space,
   wherein the second elastic element is clamped with its first side surface facing the inner surface of the second housing part in the inner space;
   wherein the spring is designed such that when aerating or deaerating the first pressure space or charging the first pressure space with overpressure, a bending of at least one of the spring plates of the elastic elements is changeable and thereby the device changes between an open state, in which an object to be clamped is spaced apart from the one or more clamping surfaces, and a closed state, in which at least one of the one or more clamping surfaces transmits a clamping and/or braking force to the object; and
   wherein the first projection of the first sealing element of at least one of the elastic elements is adapted to make a contact with a first portion of the inner surface of one of the housing parts to thereby at least inhibit a flow connection between a region of the first pressure space and a transition between the housing parts.

12. The device according to claim 11, characterised in that the contact is at least partially sealing against a medium which has entered the housing or the first pressure space from the environment of the device through the transition of the housing parts.

13. The device according to claim 11, characterised in that the region of the first pressure space is arranged between the first projection of the first sealing element of the at least one elastic element and the inner or outer edge of the spring plate of the at least one elastic element, or the second projection of the first sealing element of the at least one elastic element.

14. The clamping and/or braking device according to claim 11, wherein the first elastic element is clamped between a first abutment surface of the first housing part and a second abutment surface of the first housing part, and wherein the first portion of the inner surface lies between the first abutment surface of the first housing part and the second abutment surface of the first housing part.

15. The component of claim 9, wherein the recess forms a first annular edge and a second annular edge of an annular opening of the housing part, wherein the inner surface of the housing part is defined between the first annular edge and the second annular edge, and wherein the inner surface forms a first slope in the region of the first annular edge and the inner surface forms a second slope in the region of the second annular edge, wherein the slopes are oriented such that the annular opening increases towards the first and second edges.

\* \* \* \* \*